(12) United States Patent
Honsho

(10) Patent No.: US 8,651,753 B2
(45) Date of Patent: Feb. 18, 2014

(54) IMAGING APPARATUS

(71) Applicant: Panasonic Corporation, Osaka (JP)

(72) Inventor: Hironori Honsho, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/934,118

(22) Filed: Jul. 2, 2013

(65) Prior Publication Data

US 2013/0294759 A1 Nov. 7, 2013

Related U.S. Application Data

(63) Continuation of application No. PCT/JP2012/008368, filed on Dec. 27, 2012.

(30) Foreign Application Priority Data

Dec. 27, 2011 (JP) ................................ 2011-285029

(51) Int. Cl.
*G03B 17/00* (2006.01)
(52) U.S. Cl.
USPC ............................ 396/428; 396/535; 348/374
(58) Field of Classification Search
USPC ........................................ 396/427, 428, 535
See application file for complete search history.

(56) References Cited

U.S. PATENT DOCUMENTS

| 4,655,548 | A | * | 4/1987 | Jue ................................ 348/373 |
| 4,736,218 | A | * | 4/1988 | Kutman ......................... 396/427 |
| 5,954,310 | A | * | 9/1999 | Soldo et al. .................... 248/660 |
| 7,209,164 | B2 | * | 4/2007 | Nishimura et al. ...... 348/207.99 |
| 2005/0174657 | A1 | * | 8/2005 | Honsho ......................... 359/819 |
| 2005/0264901 | A1 | * | 12/2005 | Honsho ......................... 359/819 |
| 2009/0028542 | A1 | * | 1/2009 | Nakamoto et al. ............ 396/427 |

FOREIGN PATENT DOCUMENTS

| JP | 09-254838 | 9/1997 |
| JP | 2001-238101 A | 8/2001 |
| JP | 2002-040548 | 2/2002 |
| JP | 2005-311761 | 11/2005 |
| JP | 2010-087964 | 4/2010 |

* cited by examiner

*Primary Examiner* — Clayton E Laballe
*Assistant Examiner* — Warren K Fenwick
(74) *Attorney, Agent, or Firm* — McDermott Will & Emery LLP

(57) ABSTRACT

An imaging apparatus (100) includes an outer shell (1) including a first case (11) and a second case (12) joined to the first case (11) and formed with a spherical inner surface, a camera body (2) arranged inside the outer shell (1) and configured to move relative to the outer shell (1), a first driver (26A) and a second driver (26B) provided in the camera body (2) and configured to drive the camera body (2) with the first and second drivers (26A, 26B) contacting an inner surface of the outer shell (1), and a drive controller (62) configured to control the first and second drivers (26A, 26B) such that the first driver (26A) contacts only the first case (11) and that the second driver (26B) contacts only the second case (12).

3 Claims, 8 Drawing Sheets

IMAGING APPARATUS

CROSS-REFERENCE TO RELATED APPLICATIONS

This is a continuation of International Application No. PCT/JP2012/008368 filed on Dec. 27, 2012, which claims priority to Japanese Patent Application No. 2011-285029 filed on Dec. 27, 2011. The entire disclosures of these applications are incorporated by reference herein.

BACKGROUND

The technique disclosed herein relates to an imaging apparatus including an imager arranged inside a case having a spherical inner surface.

In an imaging apparatus described in Japanese Patent Publication No. H09-254838, an imager is arranged inside a case having a spherical inner surface. The case is divided into two parts. Such two parts are joined together in the state in which the imager is accommodated inside the two parts. In the imaging apparatus, the imager moves relative to the inner surface of the case. This allows shooting while adjusting an imaging range. More specifically, the imager includes three drive wheels, and the drive wheels contact the inner surface of the case. In such a manner that the drive wheels are driven, the imager moves along the inner surface of the case. The imager shoots, through the case, an image of an object outside the case.

SUMMARY

In the imaging apparatus described in Japanese Patent Publication No. H09-254838, the drive wheel(s) may cross a joint, i.e., a joint part, of the case while the imager is moving. In such a case, disturbance in an image shot by the imager may occur due to impact caused when the drive wheel(s) crosses the joint part. If there is a step at the joint part, there is a possibility that the drive wheel(s) is caught by the joint part, and therefore the imager cannot move.

The technique disclosed herein has been made in view of the foregoing, and is directed to reduce or prevent adverse effects of a joint part of a case on an imager.

The technique disclosed herein is intended for an imaging apparatus for shooting an image of an object. The imaging apparatus includes a case including a first part and a second part joined to the first part, and formed with a spherical inner surface; an imager arranged inside the case and configured to move relative to the case; first and second drivers provided in the imager and configured to drive the imager with the first and second drivers contacting an inner surface of the case; and a controller configured to control the first and second drivers such that the first driver contacts only the first part and that the second driver contacts only the second part.

According to the technique disclosed herein, adverse effects of a joint part of the case on the imager can be reduced or prevented.

BRIEF DESCRIPTION OF THE DRAWINGS

FIG. 2A is the cross-sectional view of the imaging apparatus along a plane passing through the center of an outer shell and including a P axis.
FIG. 2B is the cross-sectional view of the imaging apparatus along a B-B line illustrated in FIG. 2A.

FIG. 3A is a perspective view of the camera body. FIG. 3B is a right side view of the camera body. FIG. 3C is a perspective view of the camera body from an angle different from that of FIG. 3A.

DETAILED DESCRIPTION

An embodiment is described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

<1. External Appearance>

Figure 1:
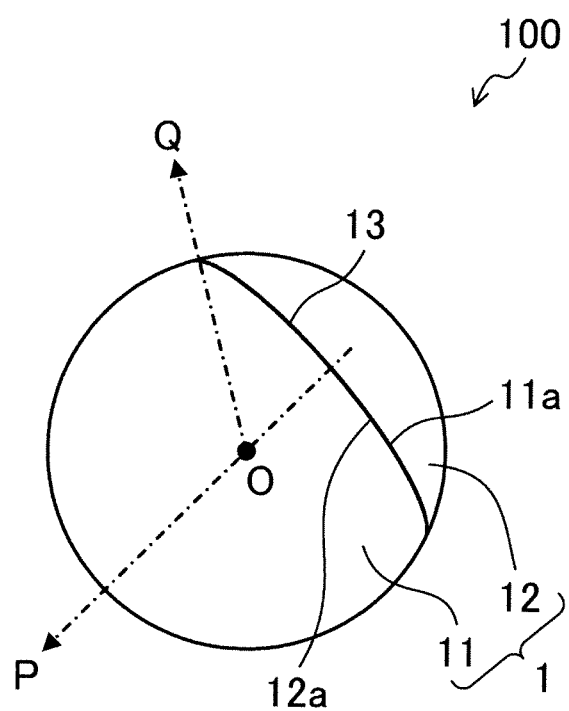
FIG. 1 is a perspective view of an imaging apparatus.
Figure 2A:
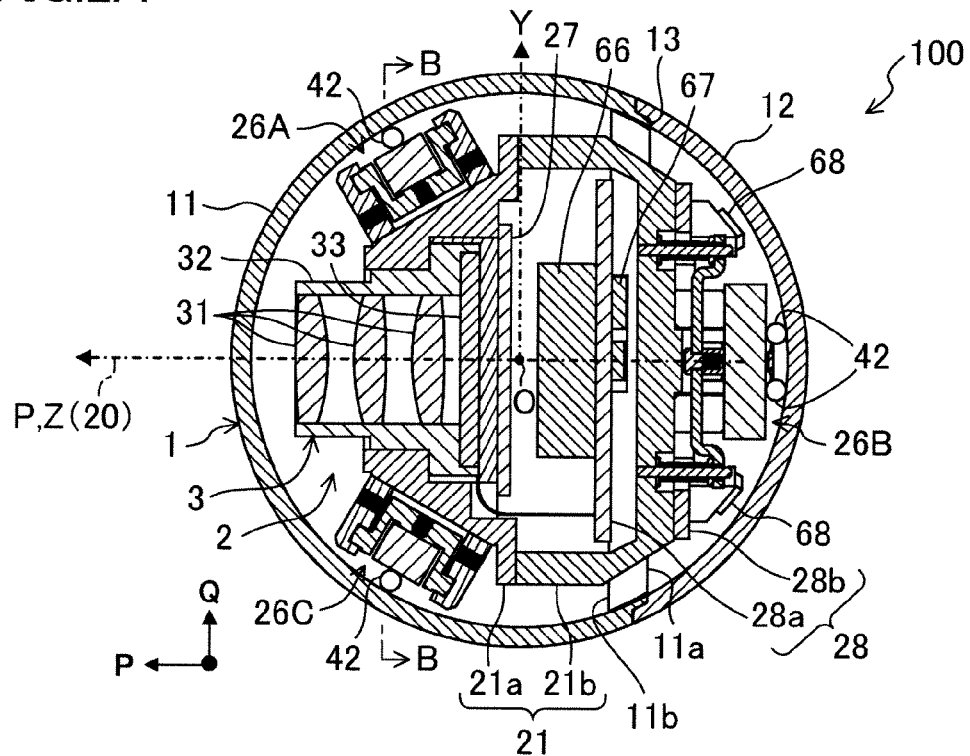
FIGS. 2A and 2B are cross-sectional views of the imaging apparatus.
Figure 2B:
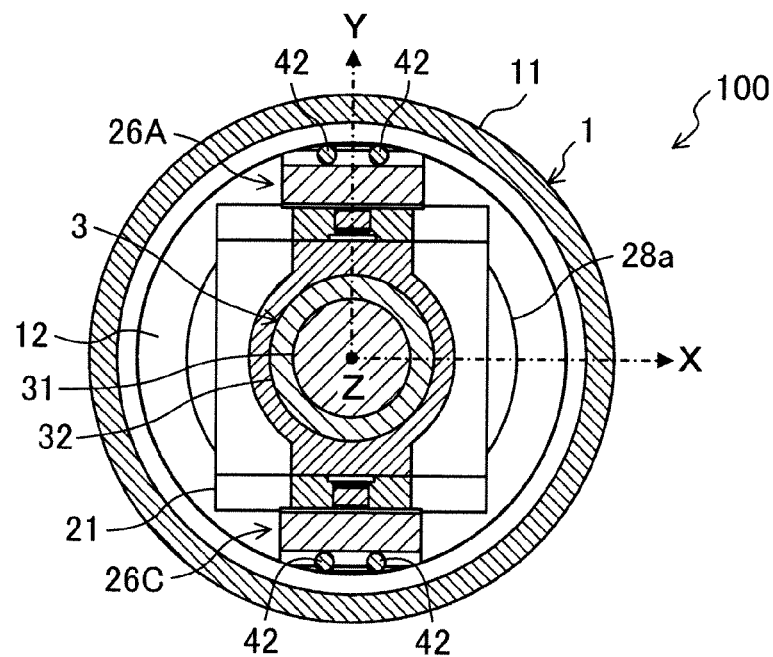

FIG. 1 is a perspective view of an imaging apparatus 100. FIGS. 2A and 2B are cross-sectional views of the imaging apparatus 100. FIG. 2A is the cross-sectional view of the imaging apparatus 100 along a plane passing through the center O of an outer shell 1 and including a P axis, and FIG. 2B is the cross-sectional view of the imaging apparatus 100 along a B-B line illustrated in FIG. 2A.

The imaging apparatus 100 includes the substantially spherical outer shell 1 and a camera body 2 arranged inside the outer shell 1. The camera body 2 moves relative to the outer shell 1 along an inner surface of the outer shell 1. While moving inside the outer shell 1, the camera body 2 shoots, through the outer shell 1, an image of an object outside the outer shell 1.

<2. Outer Shell>

The outer shell 1 includes a first case 11 and a second case 12. The first case 11 and the second case 12 are joined together, thereby forming a substantially spherical shape. The outer shell 1 has a substantially spherical inner surface. The outer shell 1 is an example of a case. The first case 11 is an example of a first part, and the second case 12 is an example of a second part.

The first case 11 is formed in a spherical-sector shape so as to have the great circle of the outer shell 1. The "spherical sector" means a "spherical zone" formed with only one opening. The first case 11 is formed with an opening 11a, and has an inner spherical zone surface. The inner surface of the first case 11 has the substantially same curvature as that of an inner surface of the second case 12. The first case 11 is made of a high hardness material (e.g., a ceramics material) transparent to visible light. The high hardness material allows reduction in abrasion due to contact with a driver element(s) 42 which will be described later. The light transmittance of the first case 11 is higher than that of the second case 12. A reflective film 11b by which infrared light is reflected is formed on the inner surface of the first case 11. Specifically, the reflective film 11b is formed in a spherical-zone shape at an opening edge part of the first case 11 on the inner surface thereof. The reflective film 11b is in such an aspherical shape that the radius about the center O of the outer shell 1 increases with approach toward an opening edge of the first case 11 (i.e., toward the second case 12).

The second case 12 is formed in a spherical-sector shape so as not to have the great circle of the outer shell 1. The second case 12 is formed with an opening 12a, and has the inner spherical zone surface. The opening 12a has the same diameter as that of the opening 11a. The second case 12 is made of a high hardness material (e.g., a ceramics material). This reduces abrasion due to contact with the driver element(s) 42 which will be described later.

The first case 11 and the second case 12 are joined together at the opening 11a and the opening 12a. Thus, the outer shell 1 includes a joint part 13.

Referring to FIG. 1, the center point (i.e., the center of the first case 11) of the outer shell 1 is defined as an "O point," a straight line passing through the O point and the center of the opening 11a of the first case 11 is defined as a "P axis," and an axis passing through the O point so as to be perpendicular to the P axis is defined as a "Q axis."

<3. Camera Body>

Figure 3A:
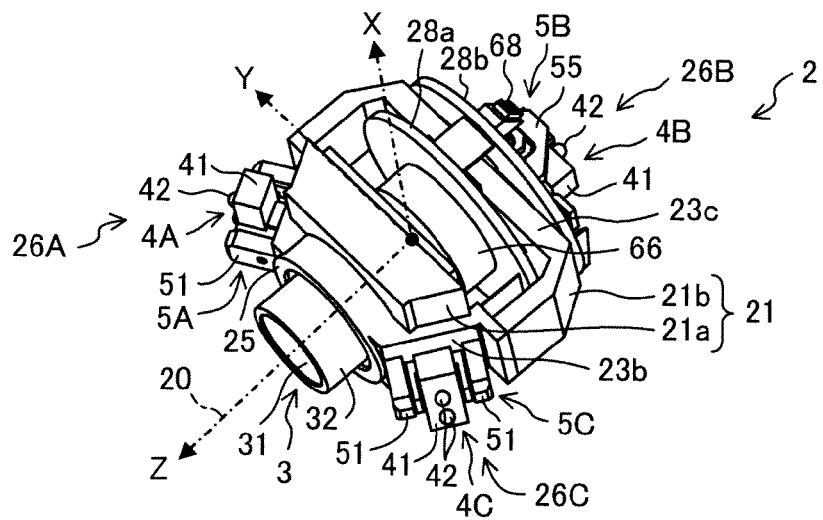
FIGS. 3A, 3B, and 3C illustrate a camera body.
Figure 3B:
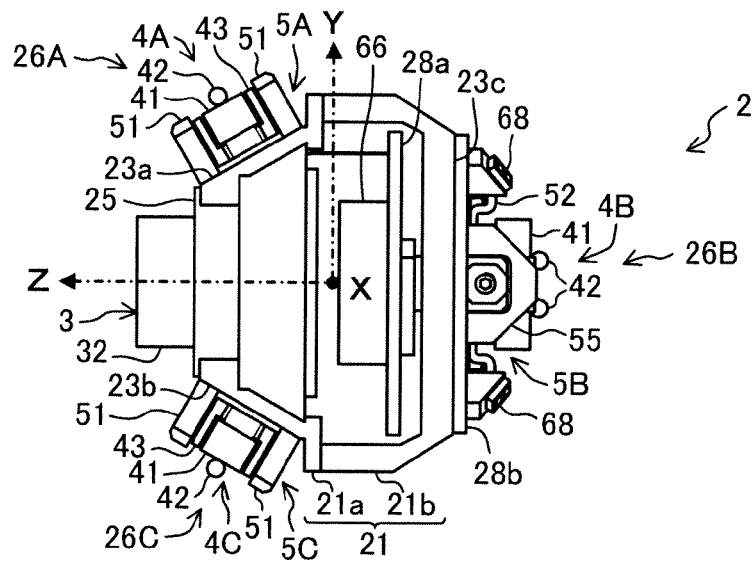
Figure 3C:
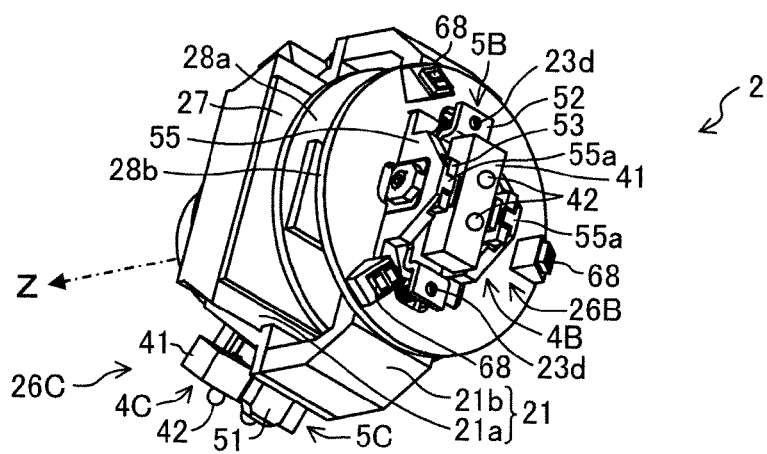
Figure 4:
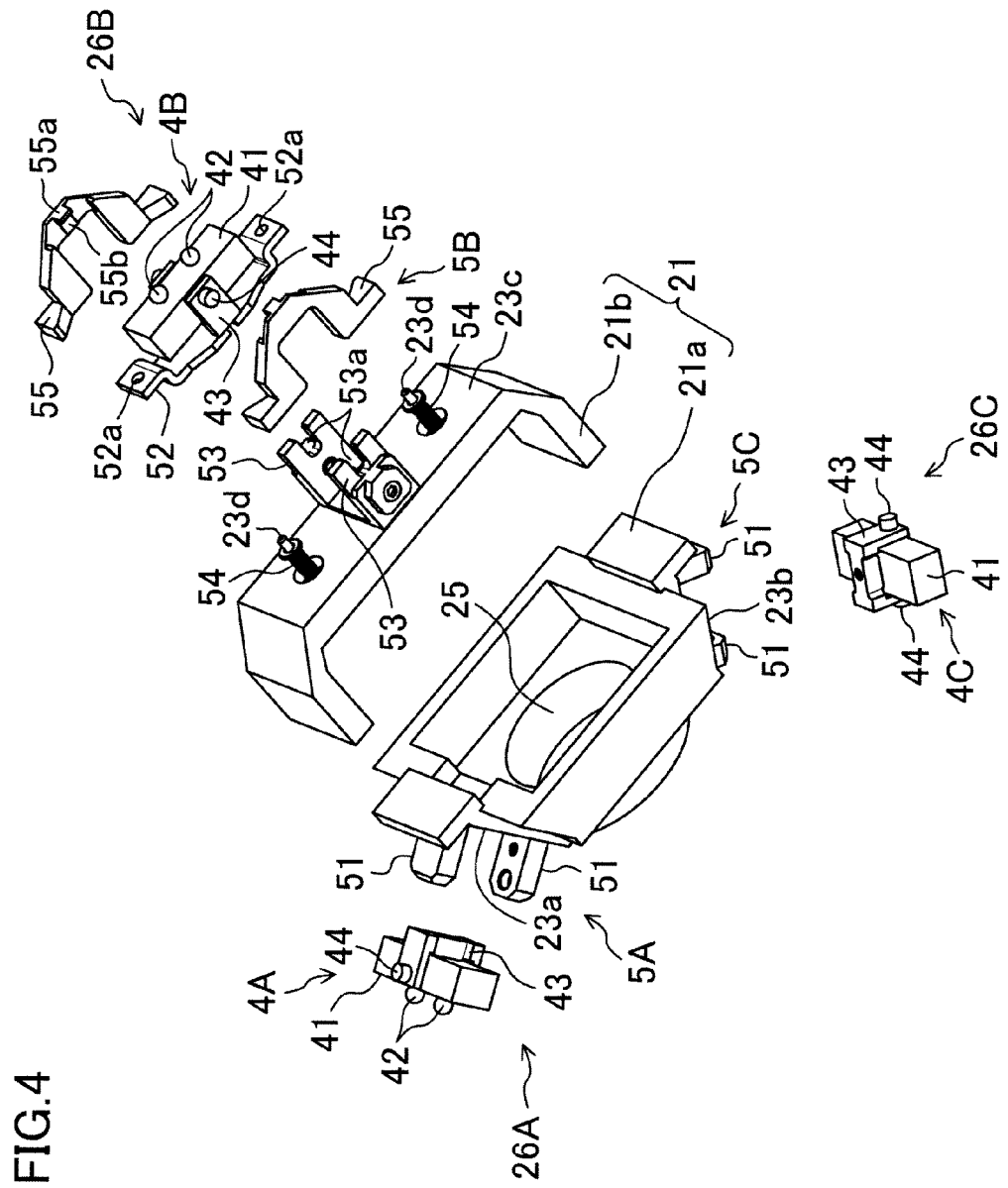
FIG. 4 is an exploded perspective view of a movable frame and first to third drivers.

FIGS. 3A, 3B, and 3C illustrate the camera body 2. FIG. 3A is a perspective view of the camera body 2. FIG. 3B is a right side view of the camera body 2. FIG. 3C is a perspective view of the camera body 2 from an angle different from that of FIG. 3A. FIG. 4 is an exploded perspective view of a movable frame 21 and first to third drivers 26A-26C.

The camera body 2 includes the movable frame 21, a lens barrel 3, the first to third drivers 26A-26C attached to the movable frame 21, an attachment plate 27 configured to attach the lens barrel 3 to the movable frame 21, and a circuit board 28 configured to control the camera body 2. The camera body 2 can shoot still images and moving pictures. An optical axis 20 of the lens barrel 3 is referred to as a "Z axis," and a side close to an object relative to the optical axis 20 is a front side. The camera body 2 is one example of an imager.

The movable frame 21 includes a first frame 21a and a second frame 21b. The first frame 21a and the second frame 21b are fixed to each other with screws. The first frame 21a includes a first side wall 23a to which the first driver 26A is attached, a second side wall 23b to which the third driver 26C is attached, and a cylindrical part 25 in which the lens barrel 3 is arranged. An axis of the cylindrical part 25 is coincident with the Z axis. The first side wall 23a and the second side wall 23b are parallel to an X axis perpendicular to the Z axis, and are inclined to the Z axis. Specifically, the Z axis is a bisector of an angle between the normal of an outer surface of the first side wall 23a and the normal of an outer surface of the second side wall 23b. The second frame 21b includes a third side wall 23c to which the second driver 26B is attached. The third side wall 23c is perpendicular to the Z axis.

Note that an axis perpendicular to both of the Z and X axes is referred to as a "Y axis."

The lens barrel 3 includes a plurality of lenses 31 having the optical axis 20, a lens frame 32 configured to hold the lenses 31, and an imaging device 33. The lens frame 32 is arranged inside the cylindrical part 25 of the movable frame 21, and the optical axis 20 is coincident with the axis of the cylindrical part 25. The attachment plate 27 is provided on a back side of the imaging device 33 of the lens barrel 3 (see FIG. 2A). The lens barrel 3 is attached to the movable frame 21 through the attachment plate 27.

The first to third drivers 26A-26C are provided on an outer peripheral surface of the movable frame 21. Specifically, the first driver 26A is provided on the first side wall 23a. The second driver 26B is provided on the third side wall 23c. The third driver 26C is provided on the second side wall 23b. The first to third drivers 26A-26C are arranged about the X axis at substantially equal intervals, i.e., at about every 120°.

The first driver 26A includes an actuator body 4A and a first support mechanism 5A. The second driver 26B includes an actuator body 4B and a second support mechanism 5B. The third driver 26C includes an actuator body 4C and a third support mechanism 5C.

The actuator bodies 4A-4C have the same configuration. Only the actuator body 4A will be described below, and the description of the actuator bodies 4B, 4C will not be repeated. The actuator body 4A includes an oscillator 41, two driver elements 42 attached to the oscillator 41, and a holder 43 configured to hold the oscillator 41.

The oscillator 41 is a piezoelectric device made of multi-layer ceramic. The oscillator 41 is formed in a substantially rectangular parallelepiped shape. In such a manner that predetermined drive voltage (alternating voltage) is applied to an electrode (not shown in the figure) of the oscillator 41, the oscillator 41 harmonically generates stretching vibration in a longitudinal direction of the oscillator 41 and bending vibration in a transverse direction of the oscillator 41.

The driver elements 42 are, on one side surface of the oscillator 41, arranged in the longitudinal direction of the oscillator 41. The driver element 42 is a ceramic spherical body, and is bonded to the oscillator 41. The stretching vibration and the bending vibration of the oscillator 41 generates elliptic motion of each of the driver elements 42. By the elliptic motion of the driver elements 42, drive force in the longitudinal direction of the oscillator 41 is output.

The holder 43 is made of polycarbonate resin containing glass. The holder 43 sandwiches the oscillator 41 from both sides in a layer stacking direction (i.e., a direction perpendicular to both of the longitudinal and transverse directions) of the oscillator 41. The holder 43 is bonded to the oscillator 41. In the holder 43, a rotary shaft 44 extending in the layer stacking direction of the oscillator 41 is provided so as to outwardly protrude.

The first support mechanism 5A includes two brackets 51. The brackets 51 are screwed to an outer surface of the first side wall 23a. The brackets 51 rotatably support the rotary shaft 44 of the holder 43 with the actuator body 4A being sandwiched between the brackets 51. Thus, the actuator body 4A is supported by the first support mechanism 5A so as to rotate about an axis which is contained in a plane including the Y and Z axes and which is inclined to the Z axis. In such a state, the driver elements 42 of the actuator body 4A are arranged parallel to the X axis.

The third support mechanism 5C has a configuration similar to that of the first support mechanism 5A, and includes two brackets 51. The brackets 51 are screwed to an outer surface of the second side wall 23b. The brackets 51 rotatably support the rotary shaft 44 of the holder 43 with the actuator body 4C being sandwiched between the brackets 51. Thus, the actuator body 4C is supported by the third support mechanism 5C so as to rotate about the axis which is contained in the plane including the Y and Z axes and which is inclined to the Z axis. In such a state, the driver elements 42 of the actuator body 4C are arranged parallel to the X axis.

The second support mechanism 5B includes a holding plate 52 attached to the holder 43, two supports 53 configured to support the rotary shaft 44 of the actuator body 4B, two biasing springs 54, and stoppers 55 configured to restrict movement of the rotary shaft 44. The holding plate 52 is screwed to the holder 43. The holding plate 52 is a plate-shaped member extending in the longitudinal direction of the oscillator 41, and an opening 52a is formed in each end part of the holding plate 52. A tip end of a pin 23d which will be described later is inserted into the opening 52a. The supports 53 are arranged parallel to a X-axis direction on the third side wall 23c. A guide groove 53a engaged with the rotary shaft 44 is formed at a tip end of the support 53. The guide groove 53a extends in a direction parallel to the Z axis. The rotary shaft 44 of the holder 43 is fitted into the guide grooves 53a so as to move back and forth in a longitudinal direction of the guide groove 53a and to rotate about an axis of the rotary shaft 44. Each tip end of the rotary shaft 44 protrudes beyond the support 53 in the X-axis direction. Two pins 23d are provided on an outer surface of the third side wall 23c. The biasing spring 54 is fitted onto the pin 23d. The stopper 55 includes a first restrictor 55a configured to restrict movement of the rotary shaft 44 in the longitudinal direction (i.e., a direction in which the guide groove 53a extends) of the guide groove 53a, and a second restrictor 55b configured to restrict movement of the rotary shaft 44 in a direction parallel to the X axis. The stoppers 55 are screwed to the third side wall 23c. In the state in which the stoppers 55 are attached to the third side wall 23c, each of the first restrictors 55a is fitted into a tip end of the guide groove 53a (see FIG. 3A). In the state in which the stoppers 55 are attached to the third side wall 23c, each of the second restrictors 55b is arranged at a position facing the tip end of the rotary shaft 44 engaged with the guide grooves 53a.

In the second support mechanism 5B configured as described above, the actuator body 4B is mounted in the supports 53 such that the rotary shaft 44 of the holder 43 is fitted into the guide grooves 53a. The holding plate 52 and the third side wall 23c sandwich the biasing springs 54, thereby compressing and deforming the biasing springs 54. In such a state, the stoppers 55 are screwed to the third side wall 23c. The actuator body 4B is, by elastic force of the biasing springs 54, biased toward a side apart from the third side wall 23c in the direction perpendicular to the Z axis. Since each of the tip ends of the guide grooves 53a is closed by the first restrictor 55a of the stopper 55, the rotary shaft 44 is prevented from being detached from the guide grooves 53a. Moreover, since each of the second restrictors 55b of the stoppers 55 is arranged at the position facing the tip end of the rotary shaft 44, movement of the actuator body 4B in the X-axis direction is restricted by the second restrictors 55b. That is, the actuator body 4B is supported by the second support mechanism 5B so as to move in the longitudinal direction of the guide groove 53a and to rotate about the rotary shaft 44. In such a state, the driver elements 42 of the actuator body 4B are arranged parallel to the Y axis.

Figure 5:
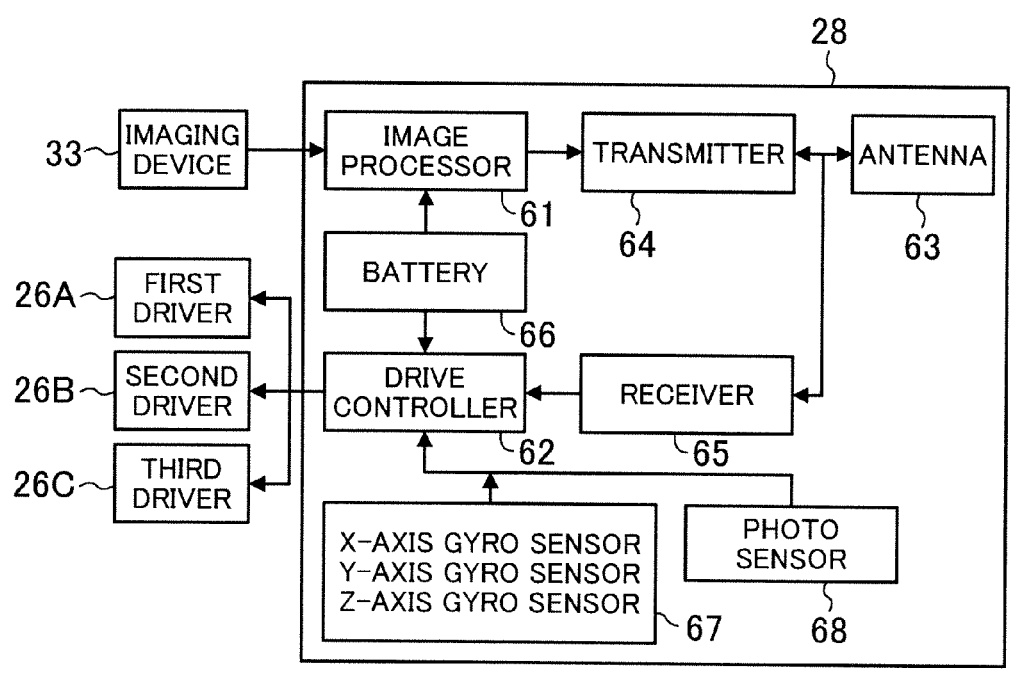
FIG. 5 is a functional block diagram of the imaging apparatus.

FIG. 5 is a functional block diagram of the imaging apparatus 100. The circuit board 28 includes an image processor 61 configured to perform video signal processing based on an output signal from the imaging device 33, a drive controller 62 configured to control driving of the first to third drivers 26A-26C, an antenna 63 configured to transmit/receive a wireless signal, a transmitter 64 configured to convert a signal from the image processor 61 into a transmission signal to transmit the transmission signal through the antenna 63, a receiver 65 configured to receive a wireless signal through the antenna 63 and to convert the wireless signal to output the converted signal to the drive controller 62, a battery 66, a gyro sensor 67 configured to detect the angular velocity of the camera body 2, and three photo sensors 68 configured to detect the position of the camera body 2. The drive controller 62 is an example of a controller.

Referring to FIGS. 3A-3C, the circuit board 28 is divided into a first board 28a and a second board 28b. The image processor 61, the drive controller 62, the antenna 63, the transmitter 64, the receiver 65, the battery 66, and the gyro sensor 67 are provided on the first board 28a. The photo sensors 68 are provided on the second board 28b. The first board 28a and the second board 28b are attached to the second frame 21b so as to sandwich the third side wall 23c. The first board 28a is positioned inside the movable frame 21, and the second board 28b is positioned outside the movable frame 21.

The battery 66 is provided on one of surfaces of the first board 28a, and the gyro sensor 67 is provided on the other surface of the first board 28a. The photo sensors 68 are provided on a surface of the second board 28b opposite to the first board 28a.

The gyro sensor 67 is for three detection axes. That is, the gyro sensor 67 is a sensor package including an X-axis gyro sensor configured to detect a rotation angular velocity about the X axis, a Y-axis gyro sensor configured to detect a rotation angular velocity about the Y axis, and a Z-axis gyro sensor configured to detect a rotation angular velocity about the Z axis. The gyro sensor 67 is configured to output a signal corresponding to an angular velocity about each of the detection axes. Rotational movement of the camera body 2 can be detected based on an output signal of the gyro sensor 67.

The photo sensor 68 includes a light emitter (not shown in the figure) configured to output infrared light, and a light receiver (not shown in the figure) configured to receive infrared light. The photo sensor 68 is configured to emit/receive infrared light having a wavelength of 900 nm. Since an IR cut filter is provided in the front of the imaging device 33, unexpected appearance of unnecessary light in a shot image due to infrared light from the photo sensors 68 can be reduced or prevented. The photo sensors 68 are, on the second board 28b, arranged about the Z axis at about every 120°. Each of the photo sensors 68 is arranged so as to output infrared light toward the inner surface of the outer shell 1 and to receive light reflected by the inner surface. Although details will be described later, the position of the camera body 2 inside the outer shell 1 can be detected based on output signals of the photo sensors 68.

The image processor 61 is configured to perform, e.g., amplification and A/D conversion of an output signal of the imaging device 33. The drive controller 62 is configured to output drive voltage (i.e., a control signal) to each of the first to third drivers 26A-26C. The drive controller 62 generates drive voltage based on a signal (command) input from the outside through the antenna 63 and the receiver 65, an output signal of the gyro sensor 67, and output signals of the photo sensors 68.

<4. Arrangement of Camera Body Inside Outer Shell>

Referring to FIGS. 2A and 2B, the camera body 2 is arranged inside the outer shell 1. The state in which the Z axis of the camera body 2 and the P axis of the outer shell 1 are coincident with each other is referred to as a "reference state." That is, FIGS. 2A and 2B illustrate the reference state of the imaging apparatus 100. Each of the driver elements 42 of the first and third drivers 26A, 26C contacts the inner surface of the first case 11. The driver elements 42 of the second driver 26B contact the inner surface of the second case 12. The lens barrel 3 faces the first case 11, and the camera body 2 shoots an image of an object through the first case 11. The second board 28b is positioned inside the second case 12 in the reference state. The second driver 26B is movable in a radial direction (i.e., a Z-axis direction) about the X axis, and is biased toward the outside in the radial direction by the biasing springs 54. Thus, the driver elements 42 of the second driver 26B contact the inner surface of the second case 12 in the state in which the driver elements 42 are pressed against the inner surface of the second case 12 by elastic force of the biasing springs 54. The driver elements 42 of the first and third drivers 26A, 26C contact the inner surface of the first case 11 in the state in which the driver elements 42 are pressed against the inner surface of the first case 11 by reactive force of the biasing springs 54. The actuator body 4B of the second driver 26B is movable in the Z-axis direction, and each of the actuator bodies 4A-4C of the first to third drivers 26A-26C is supported so as to rotate about the rotary shaft 44. Thus, e.g., a shape error of the inner surface of the outer shell 1 and an assembly error of each of the drivers are absorbed.

The photo sensors 68 are provided on the surface of the second board 28b opposite to the movable frame 21. The photo sensors 68 are arranged about the Z axis at about every 120°. In the reference state, the photo sensors 68 face the inner surface of the second case 12, but do not face the reflective film 11b. Note that the photo sensors 68 do not contact the inner surface of the second case 12. When the camera body 2 rotates about the X axis from the reference state, the photo sensor 68 enters the first case 11, and therefore faces the reflective film 11b. Since the reflective film 11b is in the aspherical shape as described above, the distance between the photo sensor 68 and the reflective film 11b changes depending on the rotation angle (i.e., the inclination angle of the Z axis of the camera body 2 relative to the P axis of the outer shell 1) of the camera body 2 about the X axis. The photo sensor 68 is configured to output a detection signal corresponding to the distance between the photo sensor 68 and the reflective film 11b. Thus, it can be, based on the detection signal, determined how far the photo sensor 68 is from the opening edge of the first case 11, and therefore the inclination of the Z axis of the camera body 2 relative to the P axis of the outer shell 1 can be obtained.

<5. Operation of Camera Body>

When drive voltage is applied to the first to third drivers 26A-26C, elliptic motion of each of the driver elements 42 of the first to third drivers 26A-26C is generated. The driver elements 42 of the first driver 26A are arranged in a circumferential direction about the Z axis. The driver elements 42 of the third driver 26C are arranged in the circumferential direction about the Z axis. On the other hand, the driver elements 42 of the second driver 26B are arranged in a circumferential direction about the X axis. Thus, upon the elliptic motion of the driver elements 42, the first driver 26A outputs drive force in the circumferential direction about the Z axis. The third driver 26C outputs drive force in the circumferential direction about the Z axis. The second driver 26B outputs drive force in the circumferential direction about the X axis. Thus, the drive force of the first driver 26A and the drive force of the third driver 26C can be combined together, thereby rotating the camera body 2 about the Y axis or the Z axis. Moreover, the camera body 2 can rotate about the X axis by the drive force of the second driver 26B. As in the foregoing, in such a manner that the drive force of the first to third drivers 26A-26C is adjusted, the camera body 2 can rotationally move relative to the outer shell 1, and the attitude of the camera body 2 on the outer shell 1 can be arbitrarily adjusted.

Figure 6:
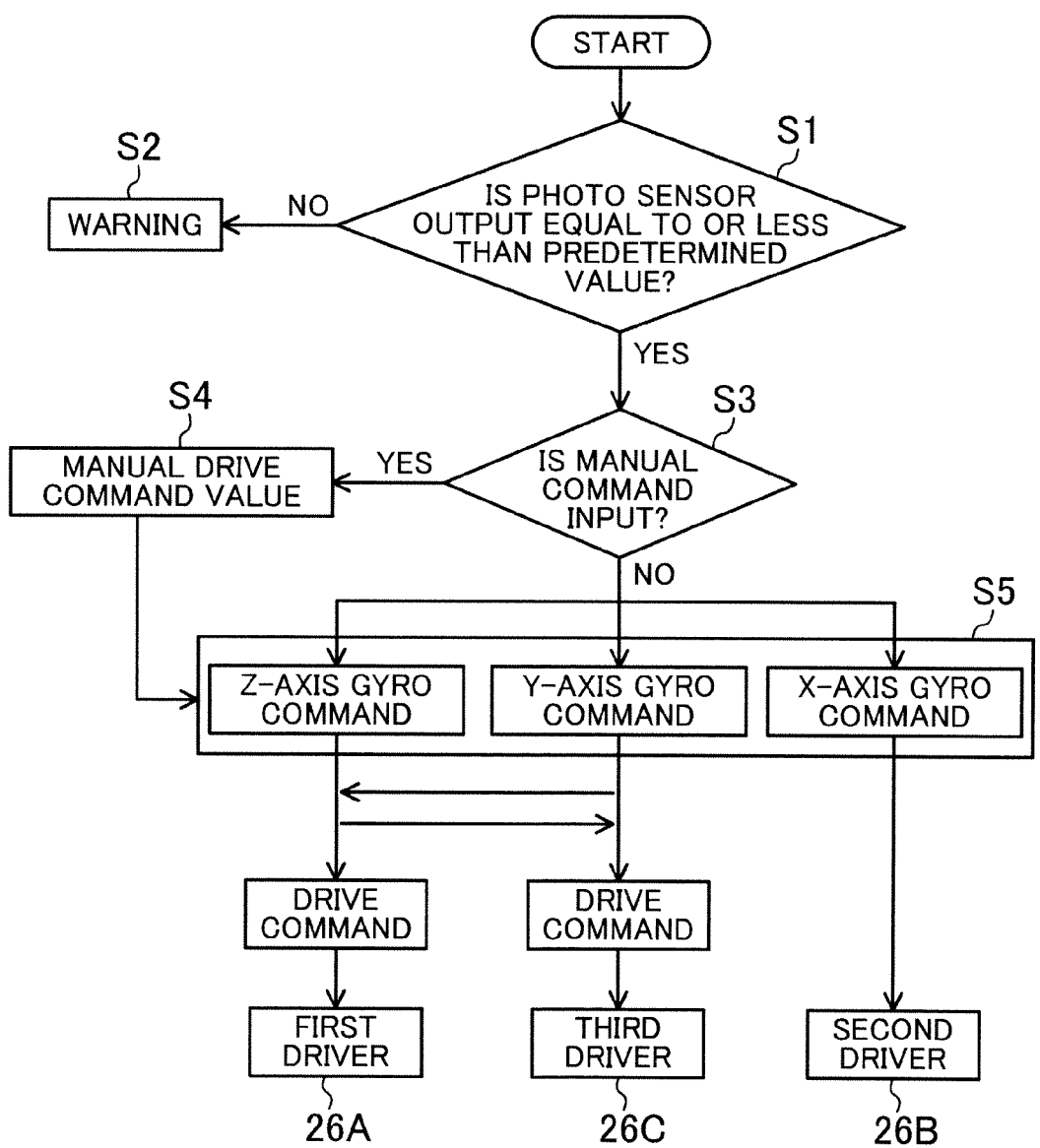
FIG. 6 is a flowchart of a drive control.

FIG. 6 is a flowchart of a drive control.

First, the drive controller 62 determines, at step S1, whether or not each output of the photo sensors 68 is equal to less than a predetermined set value. If at least one of the outputs of the photo sensors 68 exceeds the set value, the drive controller 62 outputs a warning command at step S2.

Specifically, the drive controller 62 controls a rotation range of the camera body 2 based on each output of the photo sensors 68. The reflective film 11b is, as described above, formed such that the radius about the center O of the outer shell 1 decreases with distance from the opening edge of the first case 11. Moreover, the closer the photo sensor 68 gets to an object by which the output is reflected, i.e., the reflective film 11b, the larger the output of the photo sensor 68 is. That is, the drive controller 62 can determine, based on each output of the photo sensors 68, how far the photo sensor 68 is from the opening edge of the first case 11. The farther the photo sensor 68 is from the opening edge of the first case 11, the greater the inclination of the optical axis 20 relative to the P axis of the outer shell 1 is. In such a manner that each output of the photo sensors 68 is limited at equal to or less than the predetermined set value, the rotation range of the camera body 2 is limited within a predetermined range. The rotation range of the camera body 2 will be described later.

The warning command is input to, e.g., a speaker (not shown in the figure) provided in the imaging apparatus 100. The speaker is configured to output predetermined sound. Alternatively, the drive controller 62 may perform wireless communication of the warning command with an external device (not shown in the figure) through the antenna 63.

If all outputs of the photo sensors 68 are equal to or less than the set value, the drive controller 62 determines, at step S3, whether or not a manual command is input from the outside through wireless communication. The manual command is, e.g., a command to follow a particular object or a command to perform panning (i.e., rotation about the Y axis), tilting (i.e., rotation about the X axis), or rolling (i.e., rotation about the Z axis) of the camera body 2 at a predetermined angle. If the manual command is input, the drive controller 62 proceeds to step S4. On the other hand, if no manual command is input, the drive controller 62 proceeds to step S5.

At step S4, the drive controller 62 generates a manual drive command value based on the manual command. The manual drive command value is a command value for each of the first to third drivers 26A-26C. Subsequently, the process proceeds to step S5.

At step S5, the drive controller 62 generates, based on an output of the gyro sensor 67, a command value for canceling rotation of the camera body 2 due to disturbance. Specifically, the drive controller 62 generates, based on a detection signal of the gyro sensor 67, a command value (hereinafter referred to as an "X-axis gyro command value") for rotation about the X axis, a command value (hereinafter referred to as a "Y-axis gyro command value") for rotation about the Y axis, and a command value (hereinafter referred to as a "Z-axis gyro command value") for rotation about the Z axis such that rotation about the X, Y, and Z axes of the camera body 2 is canceled. The Z-axis gyro command value and the Y-axis gyro command value are synthesized at a predetermined rate, thereby generating a drive command value to be output to the first driver 26A. Moreover, the Z-axis gyro command value and the Y-axis gyro command value are synthesized at a predetermined rate, thereby generating a drive command value to be output to the third driver 26C. The X-axis gyro command value is output to the second driver 26B as a drive command value. If the manual drive command value is generated, a final drive command value is generated by adding the manual drive command value to a drive command value obtained based on the gyro command value. The drive controller 62 applies drive voltage corresponding to the generated drive command value to each of the first to third drivers 26A-26C.

As a result, if no manual command is input, the first to third drivers 26A-26C are operated such that disturbance acting on the camera body 2 is canceled, and therefore the attitude of the camera body 2, i.e., the direction of the optical axis 20, is maintained constant. On the other hand, if the manual command is input, the first to third drivers 26A-26C are operated such that disturbance acting on the camera body 2 is canceled and that the camera body 2 moves according to the manual command.

Since shaking of the camera body 2 upon rotation thereof is, regardless of presence/absence of the manual command, reduced based on an output of the gyro sensor 67, blurring of a shot image is reduced. Moreover, the image processor 61 detects a motion vector of a moving picture and performs, by image processing, electronic correction of an image blur based on the motion vector. That is, in the imaging apparatus 100, a relatively-large image blur with a low frequency is reduced by controlling the attitude of the camera body 2, and a relatively-small image blur with a high frequency is corrected by electronic correction of the image processor 61.

<6. Restriction of Rotation of Camera Body>

Figure 7:
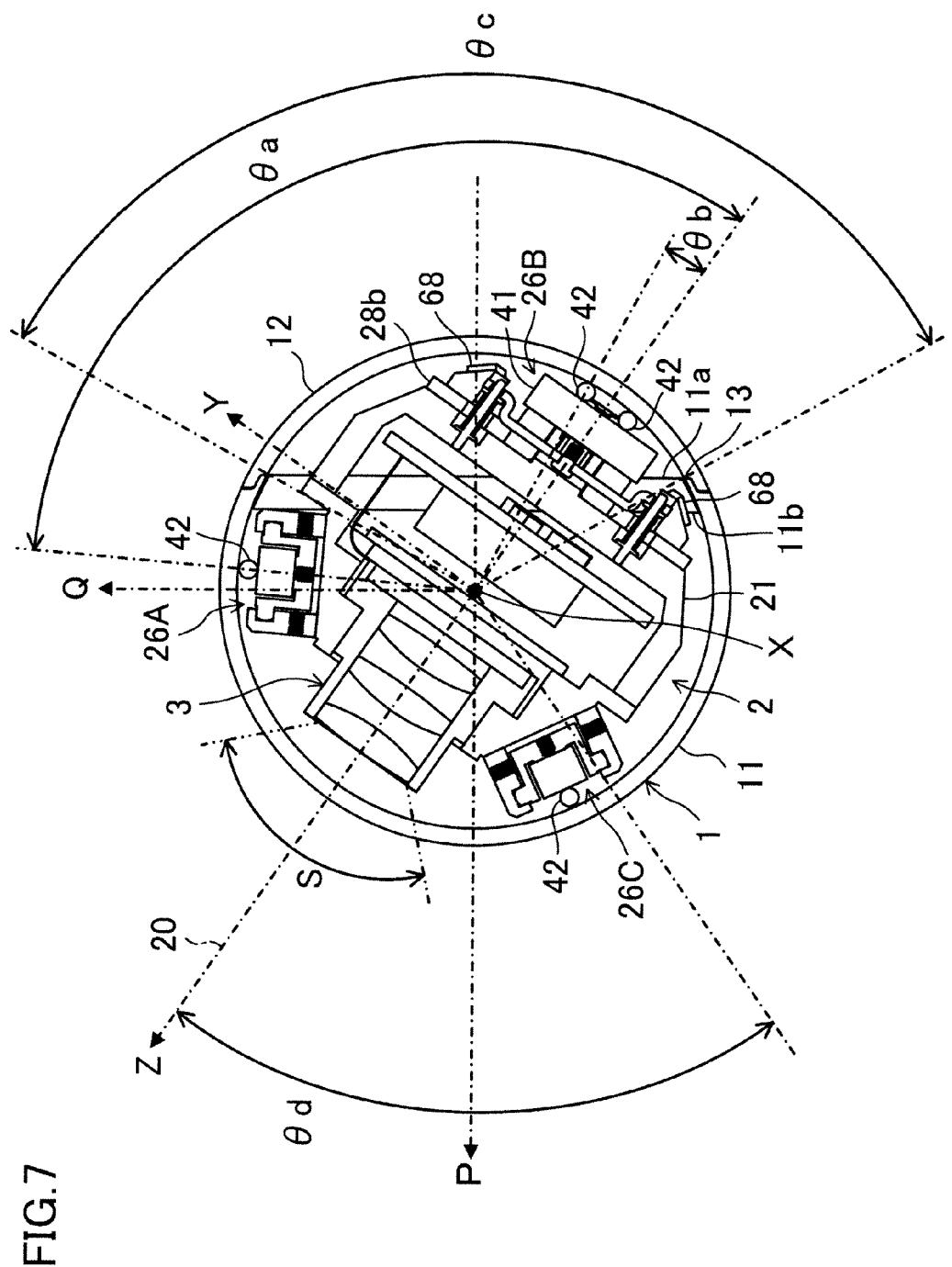
FIG. 7 is a view illustrating rotation restriction of the camera body.

FIG. 7 is a cross-sectional view of the imaging apparatus 100 in the state in which the camera body 2 rotated to reach a boundary of a rotatable range.

The drive controller 62 controls, based on each output of the photo sensors 68, the rotation range of the camera body 2 such that the driver elements 42 of the first and third drivers 26A, 26C contact not the inner surface of the second case 12 but the inner surface of the first case 11 and that the driver elements 42 of the second driver 26B contact not the inner surface of the first case 11 but the inner surface of the second case 12.

In the case where the first to third drivers 26A-26C are arranged about the X axis at about every 120°, the angle formed between two straight lines each connecting the center O of the outer shell 1 with a corresponding one of two intersections between a straight line passing through the center of the joint part 13 and the joint part 13 (i.e., the angle about the X axis between two intersections of the joint part 13 with Y and Z planes, and hereinafter referred to as an "opening angle" of the joint part 13) is 120°. Thus, the broad rotatable range of the camera body 2 can be ensured. Specifically, the following angles are identical to each other: the angle between the driver element 42 of the first driver 26A and the driver element 42 of the third driver 26C about the X axis; the angle between the driver element 42 of the third driver 26C and the midpoint between the driver elements 42 of the second driver 26B about the X axis; and the angle between the driver element 42 of the first driver 26A and the midpoint between the driver elements 42 of the second driver 26B about the X axis. That is, when each of the foregoing angles is "θa," the angle θa is 120°. The angle θb between each driver element 42 and the midpoint between the driver elements 42 about the X axis is 5° in the second driver 26B. When the opening angle θc of the joint part 13 and the angle θa between the drivers 26 are identical to each other, at least (θa/2−θb)×2=110° can be ensured for the rotatable range θd of the camera body 2. In such a state, the joint part 13 is, about the X axis, positioned at a substantially intermediate point between the driver element 42 of the second driver 26B and the driver element 42 of the first driver 26A and at a substantially intermediate point between the driver element 42 of the second driver 26B and the driver element 42 of the third driver 26C in the reference state.

In the present embodiment, the rotatable range θd of the camera body 2 is set at 90°. Specifically, when the inclination angle of the Z axis of the camera body 2 relative to the P axis of the outer shell 1 is 45°, the photo sensors 68 and the reflective film 11b are arranged such that the photo sensor 68 faces the reflective film 11b. First, when the photo sensor 68 enters the first case 11 through the opening edge thereof, the photo sensor 68 detects light reflected by the reflective film 11b. Since the reflective film 11b is formed such that the radius about the center O of the outer shell 1 decreases with distance from the opening edge of the first case 11, the output of the photo sensor 68 increases as the photo sensor 68 moves inward in the first case 11. When the output of the photo sensor 68 reaches a predetermined set value, rotation of the camera body 2 in a direction in which the inclination angle of the Z axis of the camera body 2 relative to the P axis of the outer shell 1 is increased is inhibited. The predetermined set value is set at the output of the photo sensor 68 when the inclination angle of the Z axis of the camera body 2 relative to the P axis of the outer shell 1 is 45°. Thus, the rotatable range θd of the camera body 2 is controlled at 90°. When the photo sensor 68 enters the first case 11 through the opening edge thereof toward the inside of the first case 11, the driver elements 42 of the second driver 26B approach the joint part 13 of the outer shell 1, and at least the driver elements 42 of the first driver 26A or the third driver 26C (the driver elements 42 of the first driver 26A in FIG. 7) also approach the joint part 13. As a result, the driver elements 42 of the first to third drivers 26A-26C can be prevented from passing the joint part 13 or being caught by the joint part 13. Note that, for rotation of the camera body 2 about the P axis, there is no joint part on each path of the driver elements 42, and therefore the camera body 2 can freely rotate about the P axis without restriction.

In the camera body 2, the lens barrel 3 has a specific shooting range S. The driver elements 42 of the first and third drivers 26A, 26C are arranged in part of the camera body 2 outside the shooting range S, specifically in the first and second side walls 23a, 23b. The control of the rotation range of the camera body 2 in the above-described manner results in that the driver elements 42 of the first and third drivers 26A, 26C do not reach the joint part 13, and therefore the joint part 13 can be prevented from entering the shooting range S. Consequently, unexpected appearance of the joint part 13 in a shot image can be reduced or prevented, and therefore deterioration of the shot image can be reduced.

<7. Usage Example of Imaging Apparatus>

Figure 8:
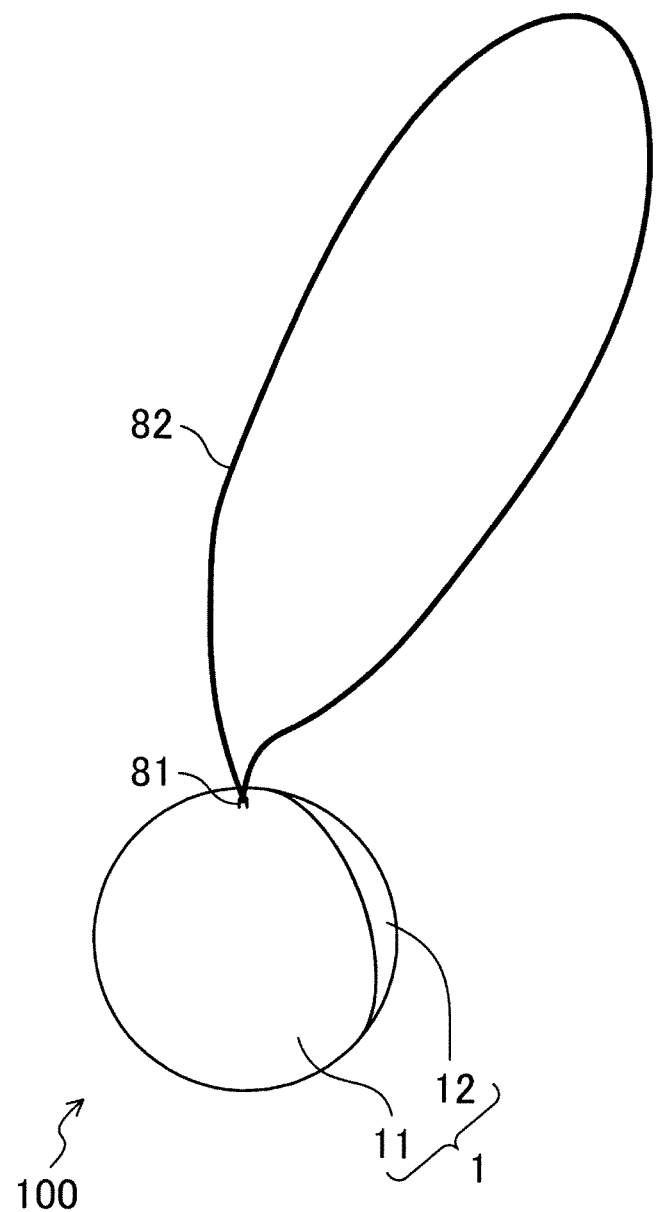
FIG. 8 is a view illustrating a usage example of the imaging apparatus.

FIG. 8 illustrates a usage example of the imaging apparatus 100.

A pin 81 is provided on an outer surface of the first case 11. A strap 82 is attached to the pin 81. A hook-and-loop fastener (not shown in the figure) is provided on an outer surface of the second case 12.

A user wears the strap 82 around a neck, and uses the imaging apparatus 100 with the imaging apparatus 100 being hung from the neck. In such a state, the hook-and-loop fastener is attached to, e.g., clothes, thereby reducing or preventing large shaking of the imaging apparatus 100 during walking etc.

The camera body 2 can be operated in panning, tilting, and rolling directions by a wireless communication device such as a smart phone. Moreover, image blurring during walking can be reduced by the gyro sensor 67.

<8. Advantages>

Thus, the imaging apparatus 100 includes the outer shell 1 including the first case 11 and the second case 12 joined to the first case 11, and formed with the spherical inner surface; the camera body 2 arranged inside the outer shell 1 and configured to move relative to the outer shell 1; the first and second drivers 26A, 26B provided in the camera body 2 and configured to drive the camera body 2 with the first and second drivers 26A, 26B contacting the inner surface of the outer shell 1; and the drive controller 62 configured to control the first and second drivers 26A, 26B such that the first driver 26A contacts only the first case 11 and that the second driver 26B contacts only the second case 12.

According to such a configuration, the first driver 26A contacts only the first case 11, and the second driver 26B contacts only the second case 12. Thus, the first and second drivers 26A, 26B can be prevented from contacting the joint part 13 of the outer shell 1. As a result, an image of an object can be shot by the camera body 2 without an influence of the joint part 13. For example, while a moving picture is being shot, if the first driver 26A or the second driver 26B passes the joint part 13, there is a possibility that disturbance in the shot picture occurs because the camera body 2 receive impact caused due to passage of the first driver 26A or the second driver 26B. Not only while an image is being shot but also while the camera body 2 is moving inside the outer shell 1, there is a possibility that the camera body 2 becomes unmovable because the first driver 26A or the second driver 26B is caught by the joint part 13. According to such a configuration, the first driver 26A or the second driver 26B does not contact the joint part 13. Thus, disturbance in an image due to the joint part 13 can be reduced or prevented, and blocking of movement of the camera body 2 by the joint part 13 can be reduced or prevented.

The camera body 2 is configured to shoot an object image through the first case 11, and the joint part 13 between the first case 11 and the second case 12 does not enter the shooting range S of the camera body 2.

According to such a configuration, the joint part 13 is prevented from entering the shooting range S of the camera body 2. As a result, deterioration of the quality of a shot image due to unexpected appearance of the joint part 13 in the shot image can be reduced or prevented.

The imaging apparatus 100 further includes the third driver 26C contacting only the first case 11. The first and third drivers 26A, 26C are arranged in part of the camera body 2 outside the shooting range S thereof.

According to such a configuration, the first and third drivers 26A, 26C are arranged in part of the camera body 2 outside the shooting range S. That is, the first and third drivers 26A, 26C do not appear in a shot image. Moreover, the first and third drivers 26A, 26C are arranged on the inside of the first case 11 relative to the joint part 13, and are prevented from contacting the joint part 13. That is, the first and third drivers 26A, 26C arranged outside the shooting range S do not reach the joint part 13, and therefore the joint part 13 does not enter the shooting range S. Thus, deterioration of the quality of a shot image due to unexpected appearance of the joint part 13 in the shot image can be reduced or prevented.

OTHER EMBODIMENT

As described above, the foregoing embodiment has been described as example techniques disclosed in the present application. However, the techniques according to the present disclosure are not limited to the foregoing embodiment, but are also applicable to those where modifications, substitutions, additions, and omissions are made. In addition, elements described in the foregoing embodiment may be combined to provide a different embodiment. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

The foregoing embodiment may have the following configurations.

The imaging apparatus 100 shoots still images and moving pictures. However, the imaging apparatus 100 may shoot only still images or moving pictures.

The first to third drivers 26A-26C are vibration actuators each including a piezoelectric device, but are not limited to such actuators. For example, the driver may include a stepping motor and a drive wheel, and may be configured such that the drive wheel contacts the inner surface of the outer shell 1.

The first to third drivers 26A-26C are arranged about the X axis at equal intervals, but are not necessarily arranged at equal intervals. Moreover, the number of drivers is not limited to three, and may be two or less or four or more. For example, if the imaging apparatus 100 includes four drivers, the four drivers may be arranged at equal intervals (i.e., at every 90°).

In the foregoing embodiment, the rotation range of the camera body 2 is limited by the reflective film 11b and the photo sensors 68. However, the present disclosure is not limited to such a configuration. For example, the drive controller 62 may control the rotation range of the camera body 2 by storing an original position, such as the reference state, of the camera body 2 and limiting the amount of movement from the original position. Alternatively, an annular protrusion may be formed near each of the opening edges of the first case 11 and the second case 12 so as to extend parallel to the opening edges, and rotation of the camera body 2 is mechanically restricted by the protrusions.

In the foregoing embodiment, the position of the camera body 2 is detected by the photo sensors 68, but the present disclosure is not limited to such a configuration. For example, the position of the camera body 2 may be detected by a magnet and a hall sensor, or may be detected in such a manner that a second case 12 made of metal is used to detect eddy-current loss or an electrostatic capacitance change. Image detection of the first case 11 by the camera body 2 may be used.

In the foregoing embodiment, the reflective film 11b is formed only in the opening edge part of the first case 11, but the present disclosure is not limited to such a configuration. For example, the reflective film 11b may be formed on the inner surface of the second case 12. The positions of the photo sensors 68 may be arbitrarily adjusted depending on the position of the reflective film 11b. Moreover, the shape of the reflective film 11b can be freely changed. The number of the photo sensors 68 is not limited to three, but may be one or four or more. The location and shape of the reflective film 11b and the number of the photo sensors 68 can be freely set as long as the reflective film 11b and the photo sensors 68 can detect that the camera body 2 reaches the boundary of the rotatable range.

As described above, the technique disclosed herein is useful for the imaging apparatus including the imager arranged inside the case having the spherical inner surface.

What is claimed is:

1. An imaging apparatus for shooting an image of an object, comprising:
   a case including a first part and a second part joined to the first part, and formed with a spherical inner surface;
   an imager arranged inside the case and configured to move relative to the case;
   first and second drivers provided in the imager and configured to drive the imager with the first and second drivers contacting an inner surface of the case; and
   a controller configured to control the first and second drivers such that the first driver contacts only the first part and that the second driver contacts only the second part.

2. The imaging apparatus of claim 1, wherein
the imager is configured to shoot the image of the object through the first part, and
a joint part between the first and second parts does not enter a shooting range of the imager.

3. The imaging apparatus of claim 1, further comprising:
a third driver contacting only the first part,
wherein the first and third drivers are arranged in part of the imager outside the shooting range thereof.

\* \* \* \* \*